United States Patent [19]

Gotou et al.

[11] 4,280,072

[45] Jul. 21, 1981

[54] ROTATING ELECTRIC MACHINE

[75] Inventors: Makoto Gotou, Kadoma; Kazutsugu Kobayashi, Takatsuki; Kenichiro Okumura, Sakai, all of Japan

[73] Assignee: Matsushita Electric Industrial Co., Ltd., Kadoma, Japan

[21] Appl. No.: 910,904

[22] Filed: May 26, 1978

[30] Foreign Application Priority Data

May 26, 1977 [JP] Japan .................................. 52/61979
Jun. 7, 1977 [JP] Japan .................................. 52/67671
Jun. 21, 1977 [JP] Japan .................................. 52/73971

[51] Int. Cl.$^2$ ............................................. H02K 21/22
[52] U.S. Cl. .................................... 310/67 R; 310/126
[58] Field of Search ........................... 310/67, 156, 152

[56] References Cited

U.S. PATENT DOCUMENTS

| | | | |
|---|---|---|---|
| 3,388,273 | 6/1968 | Davis | 310/67 |
| 3,466,477 | 9/1969 | Newill | 310/67 X |
| 3,493,800 | 2/1970 | Barrett | 310/67 |
| 3,505,547 | 4/1970 | Kaneko et al. | 310/67 |
| 3,710,158 | 1/1973 | Bachle et al. | 310/67 X |
| 3,860,843 | 1/1975 | Kawasaki et al. | 310/156 X |
| 4,097,754 | 6/1978 | Farr | 310/67 |
| 4,115,715 | 9/1978 | Müller | 310/67 X |

*Primary Examiner*—Donovan F. Duggan
*Attorney, Agent, or Firm*—Wenderoth, Lind & Ponack

[57] ABSTRACT

An electric rotating machine includes a field permanent magnet which is permanently magnetized to N and S poles alternately and an armature core which is arranged coaxially with the magnet and has a plurality of salient poles facing to the magnet. Poly-phase coils are wound on the root of the salient poles. By providing an indented portion at the major face of the salient pole facing the magnet, the cogging torque can be remarkably reduced, and further by providing auxiliary salient poles ripple torque can be also reduced.

19 Claims, 24 Drawing Figures

  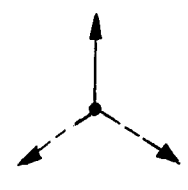
FIG.2a    FIG.2b    FIG.2c
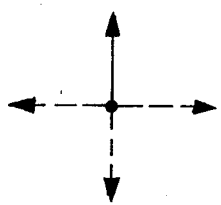 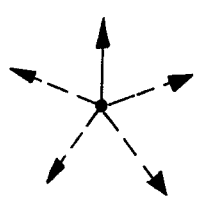
FIG.2d    FIG.2e
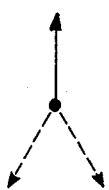 
FIG.2f    FIG.2g

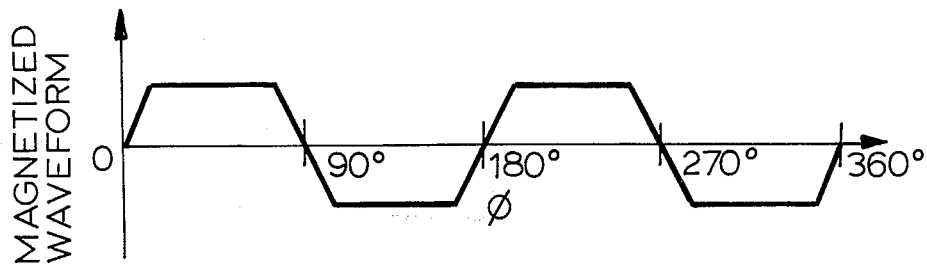
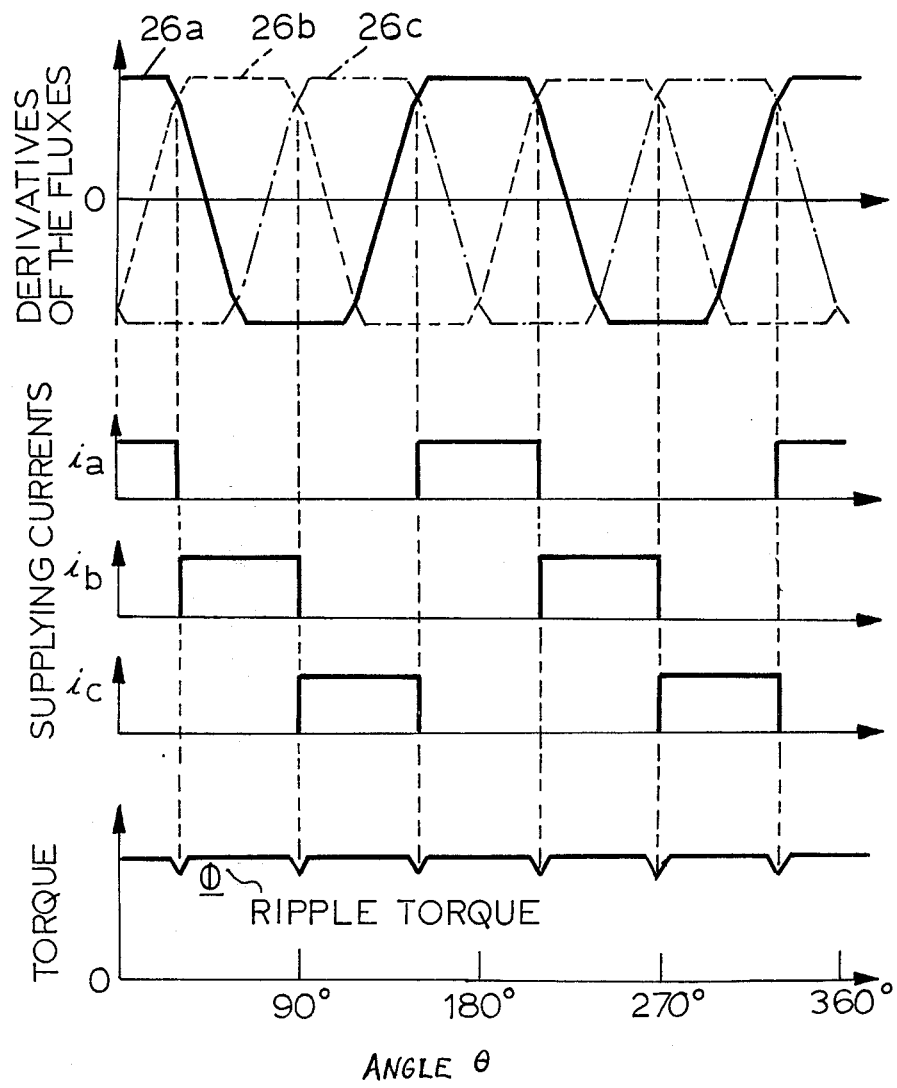

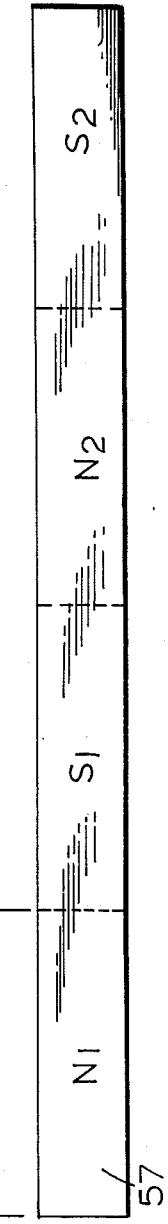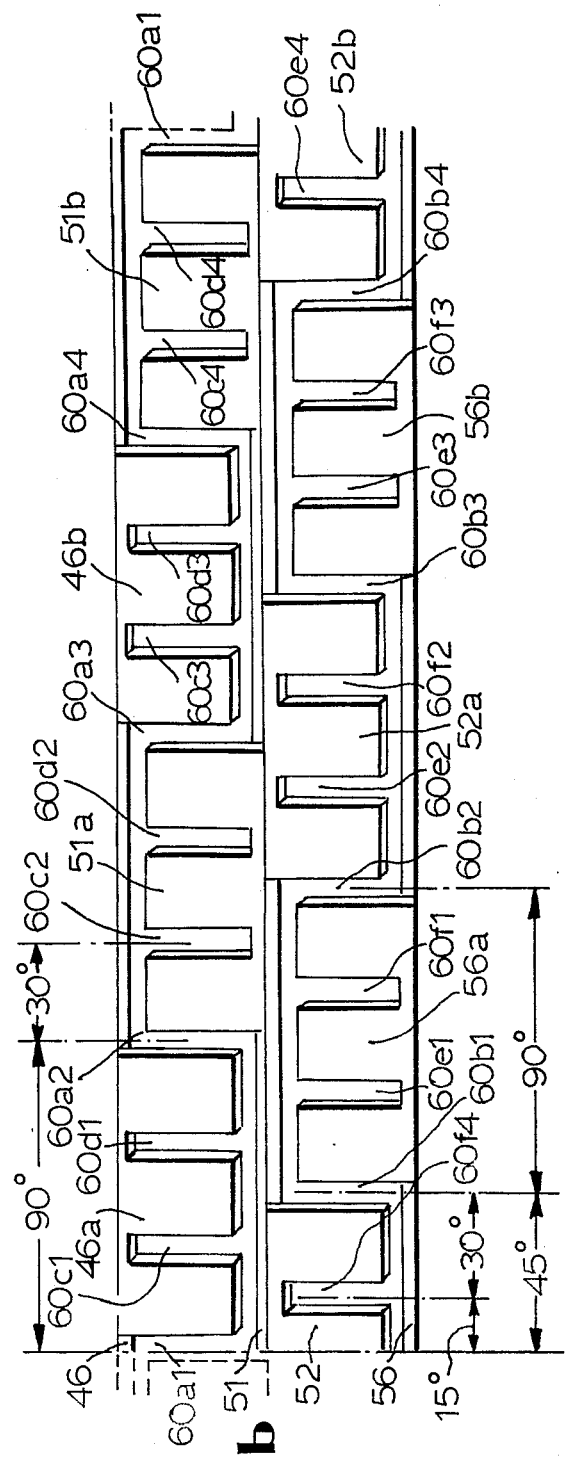
FIG.10a.
FIG.10b.

ROTATING ELECTRIC MACHINE

This invention relates to a rotating electric machine, and more particularly to a rotating electric machine, such as a motor and a generator, comprising an armature core made of magnetic material and having a plurality of saliencies and a field permanent magnet member which is polarized to have a plurality of alternating N and S poles and opposed to said saliencies of the armature core. The rotating electric machine of the invention is characterized by a greatly reduced cogging torque and reduced ripple torque according to the intended portion provided with the saliencies and the auxiliarly salient poles, as described hereinafter.

A rotating electric machine comprising an armature core of magnetic material having saliencies and a field permanent magnet member having magnetized poles opposed to the saliencies is widely used as it has a high efficiency, but in the prior art there is a problem that a harmful vibration occurs owing to an intense cogging torque generated by the interaction between the magnetized poles of the permanent magnet and the saliencies of the armature core. This cogging torque prevents a smooth rotation of the rotating electric machine, and in order to reduce the cogging torque, a skewed armature core is used in some cases. But, it is difficult to make the skewed armature core, and the cogging torque is not reduced enough sometimes. Use of an armature core having no saliency for getting smooth rotation is impractical because of a low efficiency which necessitates a large size of the machine.

Further, the rotating electric machine having the saliencies has another problem, when it is used as a motor, namely that a ripple torque due to an armature current is induced and so smooth rotation of the motor is disturbed by the resultant harmful vibration. This ripple torque is generated by an interaction between the magnetized poles of the permanent magnet and the energized saliencies of the armature core. In order to reduce the ripple torque, it is possible to vary the armature current according to the mutual position between the armature core and the permanent magnet. But, this makes the driving circuit of the rotating electric undesirably complicated, and conventionally it is difficult to reduce both the cogging torque and ripple torque.

Therefore, an object of the present invention is to provide a novel and improved rotating electric machine of high efficiency with reduced cogging torque and reduced ripple torque.

Another object of the invention is to provide a rotating electric machine comprising an armature core of magnetic material having a plurality of saliencies and a field permanent magnet member having permanently magnetized N and S poles, and having reduced cogging torque and reduced ripple torque which are related to the geometry of the armature core and the magnet.

These objects of the invention are achieved by providing the rotating electric machine according to the invention, which comprises a field permanent magnet member of a circular form and an armature core made of a magnetic material, said magnet member being permanently magnetized to have alternate N and S poles around a rotary axis of said rotating electric machine to produce field fluxes, the number of said N and S poles being P which is an even number larger than or equal to 2, i.e. $P \geq 2$, and said armature core being arranged coaxially with said magnet and having a plurality of saliencies opposed to said magnet member and a plurality of polyphase winding coils which generate polyphase alternate voltages according to the relative rotation between said armature core and said magnet member, at least one of said saliencies having at least one indented portion at the face thereof opposed to said magnet member, wherein the angle between the line from a center of said indented portion to said rotary axis and the line from a center of a neighbouring indented portion or from the center of a neighbouring space between neighbouring saliencies of said rotary axis is not equal to an integral multiple of the quotient of $(360/P)°$.

These and other objects and features of the invention will be apparent from consideration of the detailed description of the invention together with the accompanying drawings, in which:

FIG. 1 is a schematic sectional view of an embodiment of the rotating electric machine of the invention;

FIGS. 2(a) to (g) are vector diagrams for explaining the operation of reducing a harmful component of the shape harmonics in the rotating electric machine of the invention;

FIGS. 3(a) to (c) are schematic sectional views of some embodiments of the armature core used for the rotating electric machine of the invention;

FIGS. 4(a) to (d) show some shapes of indented portions formed in a saliency of the armature core;

Figure 5:
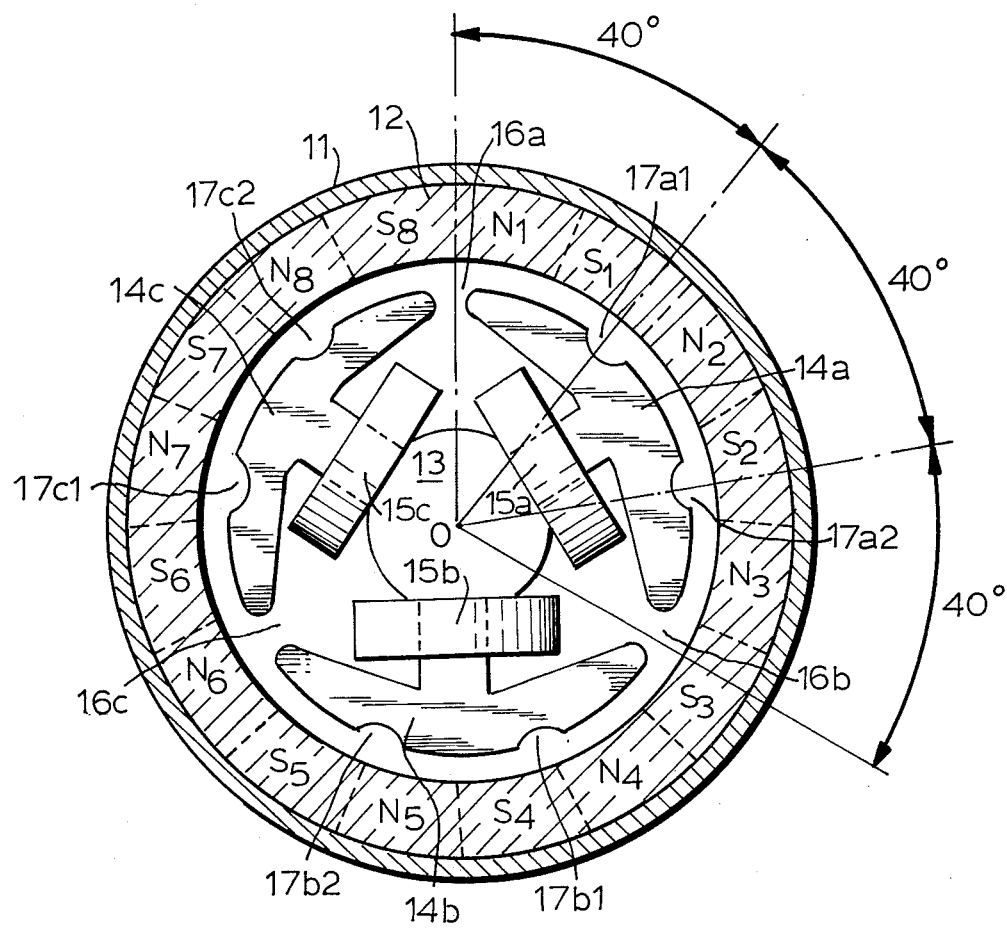
FIG. 5 is a schematic sectional view of another embodiment of the rotating electric machine of the invention.
Figure 8:
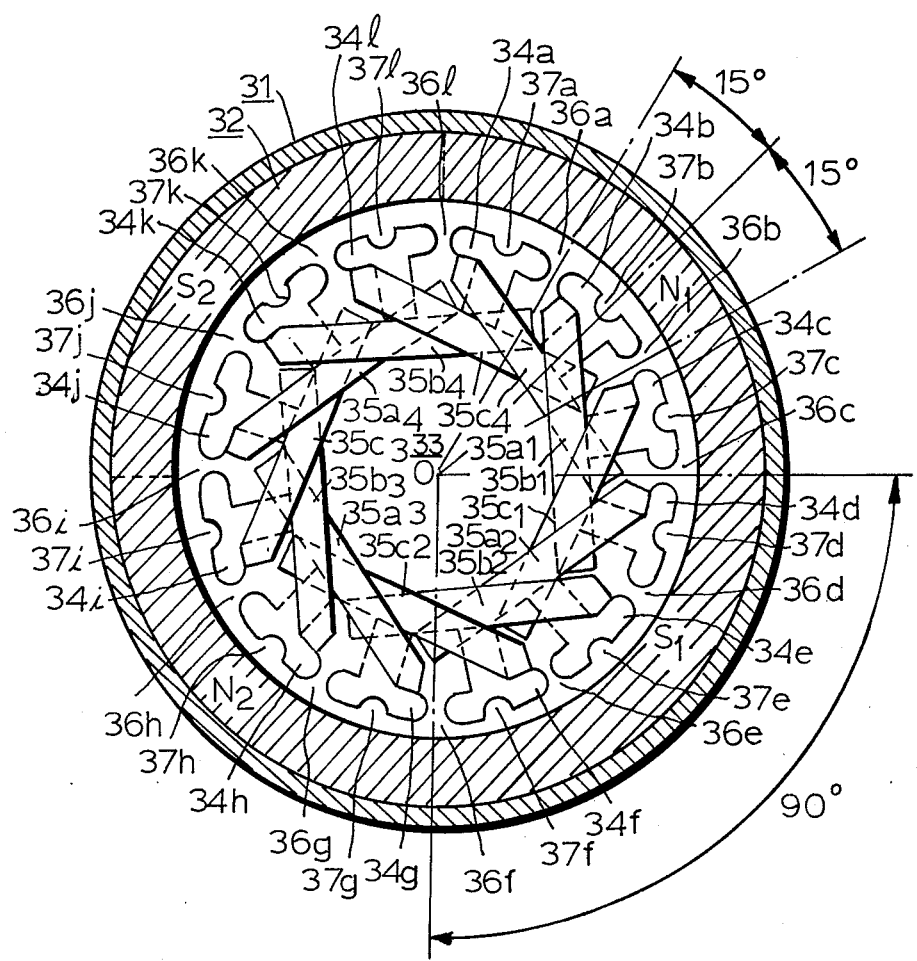
Figure 9A:
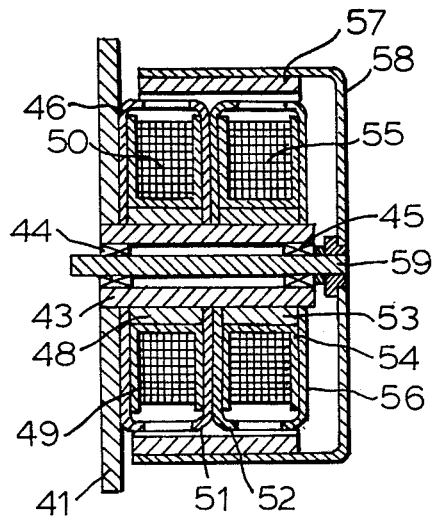

FIGS. 7(a) to (d) show waveforms for explaining the operation of the rotating electric machine of FIG. 5;

FIG. 8 is a schematic sectional view of a still further embodiment of the rotating electric machine of the invention;

FIGS. 9(a) and (b) are cross-sectional and exploded views of yet another embodiment of the rotating electric machine of the invention; and FIGS. 10(a) and (b) are developed views of the permanent magnet and the armature core shown in FIG. 9, respectively.

Now, an embodiment of the rotating electric machine of the invention will be described in detail in the following, referring to FIG. 1 which shows a sectional view of a magnet yoke designated by a reference numeral 1 and an armature core 3. The magnet yoke 1 has a permanent magnet 2 mounted on the inner periphery facing the armature core 3, and the permanent magnet 2 has a pair of permanently magnetized N and S poles. The field permanent magnet member composed of the permanent magnet 2 provides a fixed magnetic field around the armature core 3.

The armature core 3 has three salient poles 4a, 4b and 4c projected toward the permanent magnet 2. The major face of each salient pole facing the permanent magnet is wider than the bottom part thereof on which an armature coil is wound. Therefore, the armature winding can be easily provided, and further the armature core effectively gathers the magnetic flux from the permanent magnet 2. That is, three-phase winding coils 5a, 5b and 5c are wound on the bottom of the corresponding salient poles 4a, 4b and 4c in the spaces 6a, 6b and 6c between the neighbouring two salient poles, respectively.

Each major face of the salient poles 4a, 4b and 4c has two indented portions $7a_1$, $7a_2$; $7b_1$, $7b_2$; and $7c_1$ and $7c_2$, respectively. At these indented portions, the gap between the major face of the salient pole and the permanent magnet 2 is widened. The indented portions are formed parallel to the rotary axis O, that is perpendicular to the drawing in FIG. 1, and the two indented portions of one salient pole are positioned at the points about $\frac{1}{3}$ of the angle between the centers of the spaces on both sides of that salient pole, i.e. about 166 of 120°, as shown in FIG. 1. Therefore, the nine portions of the periphery of the armature core 3, i.e. the spaces 6a, 6b and 6c, and the indented portions $7a_1$, $7a_2$, $7b_1$, $7b_2$, $7c_1$ and $7c_2$, are positioned at equal or nearly equal angles of 40° facing the permanent magnet 2. As described hereinbefore, in this patent, the indented portion has no winding coil, such as a driving coil of a motor or a generating coil of a generator, provided thereon.

Figure 1:
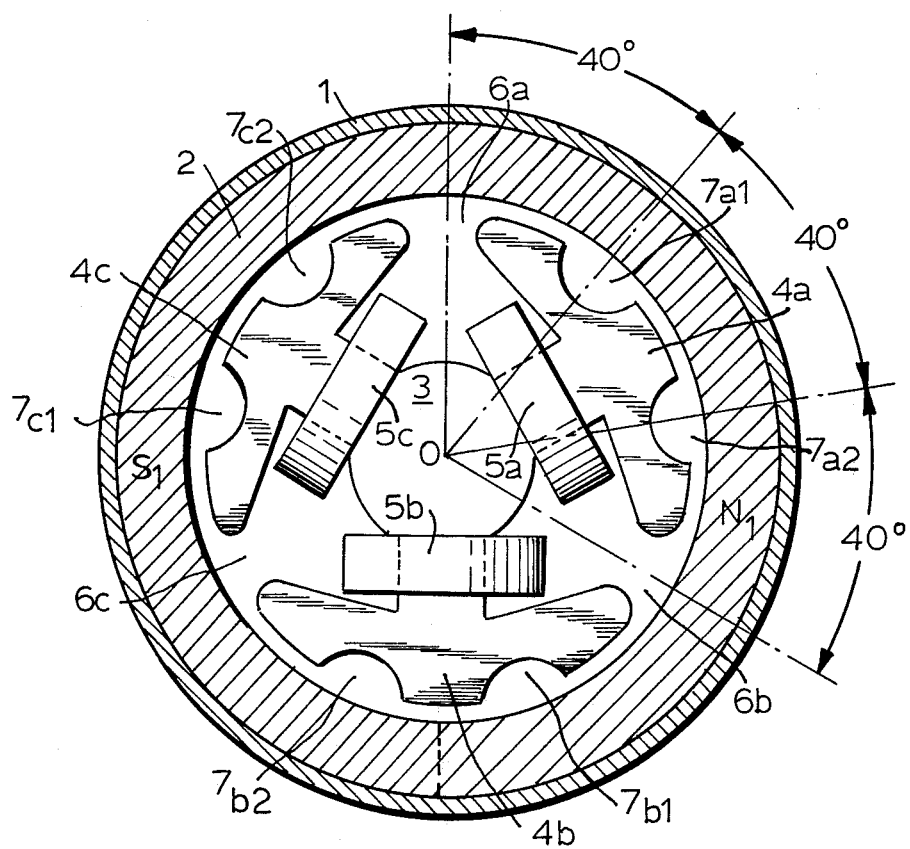

The operation of the rotating electric machine of FIG. 1 is described hereinafter. The armature core 3 and the permanent magnet 2 are rotated relatively to each other around the coaxial rotary axis O. That is, one is a rotor and the other is a stator. When the rotating electric machine of FIG. 1 is used as a generator, there are generated three-phase alternate voltages in the 3-phase winding coils 5a, 5b and 5c according to rotation of the permanent magnet 2 driven by an outside driving force. When the machine is used as a motor, there is generated a continuous driving torque according to the relative position of the permanent magnet 2 and the armature core 3 by supplying controlled 3-phase alternate currents to the 3-phase winding coils 5a, 5b and 5c through a mechanical or electronic commutator.

In the case of a motor, especially for a motor of an audio apparatus requiring a high quality, usually an electric commutator is employed which comprises a detecting means for detecting the relative position of the armature core and the permanent magnet, power transistors for supplying a current to each phase winding coil, and a switching means for driving the power transistors according to signals from the detecting means. Because the commutator is not the subject matter of the invention, no further description thereof is given. Besides, although the permanent magnet of FIG. 1 or of the other figures is formed in a continuous circular form, a magnet formed of separate parts with gaps therebetween can also be used in the present invention as will be understood from the description provided hereinafter.

The cogging torque is generated by the interaction between the field permanent magnet member having permanently magnetized poles and the armature core made of magnetic material such as iron, and it changes periodically according to the relative positions thereof with a basic period of 360° (one revolution). This is harmful for getting a smooth rotation of the rotating electric machine. The cogging torque is influenced by the shape of the armature core facing for the field permanent magnet member and by the distribution of the magnetic charge in the permanently magnetized poles of the field permanent magnet member. The shape of the armature core is represented by shape harmonics expanded by the Fourier series with the basic period of 360° (one revolution), and the shape harmonics is proper the shape of the armature core. The distribution of the magnetic charge is represented by the magnetic distribution harmonics also expanded by the Fourier series with the basic period 360° (one revolution), and the magnetic distribution harmonics is proper to the distribution of the magnetic charge in the field permanent magnet member.

Mathematically, the cogging torque is determined by the convolution between the shape harmonics and the magnetic distribution harmonics, and is also expanded by the Fourier series with the basic period 360° (one revolution). The magnitude of each component (cycle/revolution) of the cogging torque is proportional to the product of the component of the shape harmonics and the component of the magnetic distribution harmonics of the same degree number as that of the component of the cogging torque. That is, for example, the magnitude of the component 10 c/r (cycle/revolution) of the cogging torque is proportional to the product of the component 10 cycle/rev of the shape harmonics and the component 10 cycle/rev of the magnetic distribution harmonics. Therefore, it is possible to decrease the magnitude of the component of the cogging torque by reducing either the magnitude of the component of the shape harmonics or that of the magnetic distribution harmonics of the same degree number as that of the component of the cogging torque. Practically, the cogging torque of a rotating electric machine has several dominant components, and the cogging torque can be decreased by reducing one of the dominant components. According to the present invention, at least one indented portion is formed on the major face of at least one saliency opposed to the magnetized poles of the field permanent magnet member so as to reduce the component of the shape harmonics of the same degree number as that of the dominant component of the cogging torque, based on the principle described above. Then, the magnitude of the component, which is generated when there is no indented portion, is reduced and the dominant component can be easily reduced.

This will now be described for the cogging torque of the rotating electric machine of FIG. 1. As the permanent magnet 2 of the field permanent magnet member has two poles, the dominant fundamental component of the magnetic distribution harmonics is 2 c/r (cycles per revolution), and the magnetic distribution harmonics mainly has harmonic components of a 2 c/r series such as 2 c/r, 4 c/r, 6 c/r, 8 c/r, and so on. If no indented portions $7a_1$ to $7c_2$ are provided in the armature core 3, the magnetic variation of the armature core 3 is due to the spaces 6a, 6b and 6c. As these spaces 6a, 6b and 6c are positioned at equal or nearly equal angles (120°), the dominant fundamental components of the shape harmonics is 3 c/r, and the shape harmonics mainly has the components of a 3 c/r series such as 3 c/r, 6 c/r, 9 c/r, 12 c/r, and so on. Therefore, the cogging torque in the case of an armature core 3 having no indented portions is mainly composed of the common components appearing in both the shape harmonics and magnetic distribution harmonics, i.e. the components of a 6 c/r series, namely 6 c/r, 12 c/r, 18 c/r, and so on.

The effect of forming the indented portions according to the invention will be clear from the following description. The magnetic flux from the permanent magnet 2 is attracted to the salient poles opposed thereto, and it does not reach to the deep, distant part of the spaces 6a, 6b and 6c. Therefore, it is possible to consider that each of the indented portions $7a_1$ to $7c_2$ has magnetically equal or almost equal effect to that of the spaces 6a, 6b and 6c, although the gap between the indented portion and the permanent magnet is much shallower than the depth of the spaces. The indented portions $7a_1$ to $7c_2$ are positioned at equal or nearly equal angles of 40° around the rotary axis O. Thus, the dominant fundamental component of the shape harmonics of the armature core 3 for poles of having the indented portions $7a_1$ to $7c_2$ becomes 9 c/r, which is higher, by a factor of 3, than the dominant fundamental component 3 c/r of the shape harmonics of the armature core 3 where there are no indented portions. Further, the shape harmonics mainly has the components of a 9 c/r series such as 9 c/r, 18 c/r, 27 c/r and so on. Therefore, the cogging torque when using the armature core 3 with the indented portions $7a_1$ to $7c_2$ is mainly composed of the components of an 18 c/r series, namely 18 c/r, 36 c/r, 54 c/r and so on.

Comparing this result with the former, it can be understood that the rotating electric machine of the invention using the armature core having the indented portions has much fewer cogging components than that of the conventional machine using the armature core having no indented portions. Moreover, the dominant fundamental component of the cogging torque of the former is much higher, namely 18 c/r, than that of the latter, namely 6 c/r. Usually, the magnitude of the component decreases in accordance with increase of the degree number thereof for both the shape harmonics and the magnetic distribution harmonics. Further, the dominant fundamental component becomes the dominant component of the cogging torque. Accordingly, the cogging torque of the rotating electric machine of FIG. 1 using the armature core 3 with the indented portions $7a_1$ to $7c_2$ becomes much less than that of the conventional rotating electric machine using the armature core 3 without the indented portions $7a_1$ to $7c_2$, as described above.

There are many arrangements of the indented portions which can reduce the harmful component of the shape harmonics. FIGS. 2a-2g are vector diagrams for explaining the basic concept of the arrangements of the indented portions for reducing the harmful component of the cogging torque. In FIG. 2, the period of the harmful component is expressed as $2\pi$ radians, and the solid line vector shows the harmful component of the shape harmonics derived from the spaces of the armature core having no indented portions. The length of the vector indicates the magnitude of the harmful component. When other vectors shown by the dotted lines are added to the harmful vector shown in the solid line as shown in FIGS. 2(b) to (g), each of the compound vectors is reduced to zero. That is, the harmful component is reduced to zero. The dotted vectors are obtained by arranging the indented portions at the position of different phases from the spaces which cause the harmful component.

The vector diagrams of FIGS. 2(b) to (e) show examples of vectors of equal length which are positioned at an equal or nearly equal angle of the phase, and the vector diagrams of FIGS. 2(f) and (g) show examples of vectors of unequal lengths which are positioned at unequal angles of the phase. Thus, there are many arrangements of the indented portions for reducing the harmful component of the shape harmonics of the armature core.

Based on the above idea, there will now be described some embodiments of the armature core with reduced harmful 6 c/r component of the shape harmonics. Because 40° of 1 c/r is equal to 240° of 6 c/r and each of the indented portions $7a_1$ to $7c_2$ has a magnetically equal effect to each of the spaces 6a, 6b and 6c, the armature core 3 shown in the rotating electric machine of FIG. 1 is equivalent to the vector diagram of FIG. 2(c) for the harmful 6 c/r component of the shape harmonics.

Figure 3A:
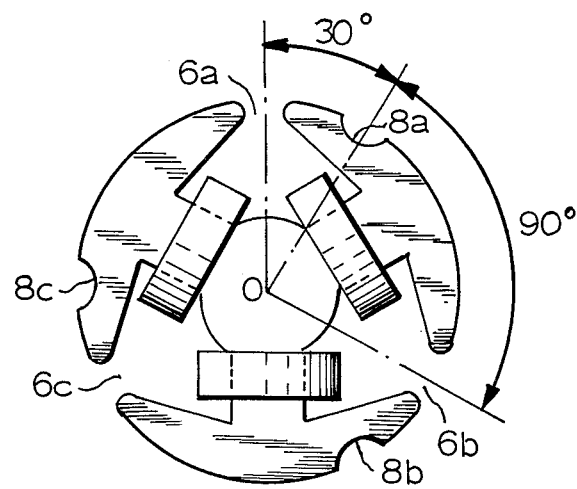
Figure 3B:
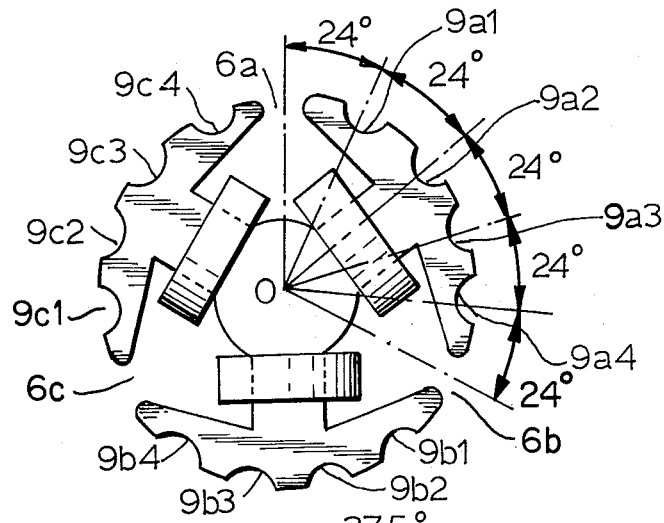
Figure 3C:
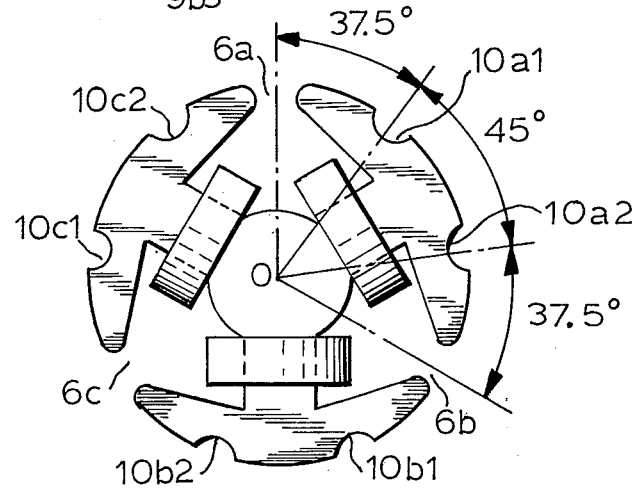

FIGS. 3(a) to (c) are schematic view of the other embodiments of the armature cores with reduced 6 c/r component. The armature core of FIG. 3(a) has 3 spaces 6a, 6b and 6c, which are identical to those of FIG. 1, and 3 indented portions 8a, 8b and 8c. Each of these indented portions is 30° away from the center of the adjacent space and has a magnetic effect equal to that of the space. Thus, this armature core is equivalent to the vector diagram of FIG. 2(b) for the 6 c/r, component, because 30° of 1 c/r is equal to 180° of 6 c/r. As 360° of 6 c/r is equal to 60° of 1 c/r, it is easily noticed that the harmful 6 c/r component of the shape harmonics is not reduced if the position of an indented portion, for example 8a, is arranged at angles of 60°, 120°, 180°, 240° and 300°. And, since the 3 indented portions 8a, 8b and 8c are at the same phase for the 6 c/r component, these indented portions can be replaced by a wider and deeper indented portion than 8a spaced at the same phase of 8a for the 6 c/r component.

The armature core of FIG. 3(b) has 12 indented portions $9a_1$ to $9a_4$, $9b_1$ to $9b_4$, and $9c_1$ to $9c_4$, each of which has magnetically equal effect to that of the spaced portion 6a, has a magnetic effect equal to that of the spaces 6a, from the center of the neighbouring indented portion or space, as shown in FIG. 3(b). Thus, the armature core of FIG. 3(b) is equivalent to the vector diagram of FIG. 2(e) for the 6 c/r component.

Another embodiment of the armature core shown in FIG. 3(c) is equivalent to the vector diagram of FIG. 2(f) for the 6 c/r component, because the center of 6 indented portions $10a_1$ to $10c_2$ on the armature core is 37.5° (225° for 6 c/r) away from the center of the neighbouring space, and has a smaller magnetic effect than the spaces 6a to 6c for the harmful 6 c/r component. The component distribution of the shape harmonics derived from the indented portion changes according to the width and depth thereof, and so the optimum shape of the indented portion is achieved by changing the width and/or depth thereof.

Although the shapes of the indented portions shown in FIG. 1 and FIG. 3 are all cylindrical, the effect of the indented portion in reducing the cogging torque is not limited to a particular shape of the indented portion. An indented portion of any shape can achieve the effect of reducing the cogging torque to a certain extent, whenever the indented portions are positioned at the opposite phase from the harmful component of the shape harmonics derived from the spaces.

Figure 4A:
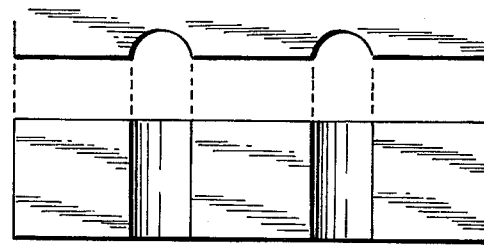
Figure 4B:
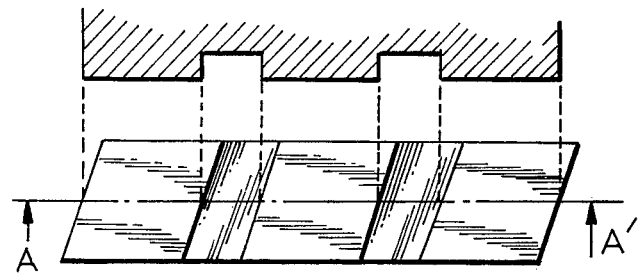
Figure 4C:
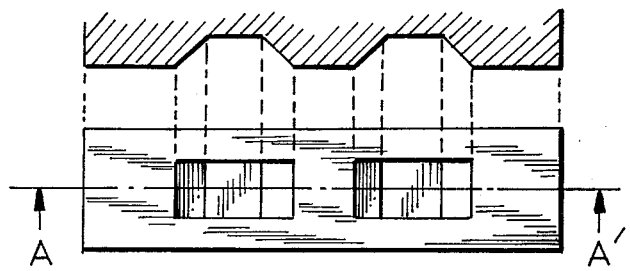
Figure 4D:
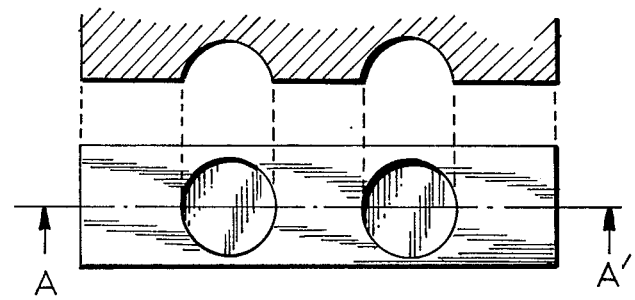

Some examples of the shapes of the indented portions suitable for the saliencies, such as the salient poles 4a, 4b and 4c shown in FIG. 1, are shown in FIGS. 4(a) to 4(d), which are front and top views of a saliency with 2 indented portions. The shape of the indented portions shown in FIG. 4(a) is cylindrical and parallel to the rotary axis, which is identical to the indented portions shown in FIG. 1. The sectional shape of the indented portions shown in FIG. 4(b) is a square, and the indented portions and both sides of the saliency are oblique to the rotary axis. This is used for a skewed armature core. FIG. 4(c) shows another example of the shape of the indented portions which is formed not all the way across the face of the saliency but only across a part thereof, and the sectional shape thereof is a trapezoid. The shape of the indented portion shown in FIG. 4(d) is a hemisphere. Further, it is not necessarily required that the shape of all the indented portions be the same. Practically, it is desirable that all of the indented portions be parallel or oblique to the rotary axis, because the armature core is usually made by laminating stamped out sheet cores.

Now, there will be described effective arrangements of the indented portions on the armature core in relation to the number of poles of the field permanent magnet member for reducing the cogging torque. When the field permanent magnet member has P poles composed of permanently and alternately magnetized N and S poles facing the armature core, the dominant fundamental number of the magnetic distribution harmonics is P, and the magnetic distribution harmonics mainly have harmonic components in the P c/r series such as P c/r, 2P c/r, 3P c/r and so on. As described hereinbefore, an arbitrary component of the cogging torque is proportional to the product of the component of the magnetic distribution harmonics and the component of the shape harmonics of the same degree number, so that it is desirable to arrange the indented portions so that each angle between the center of an indented portion and the center of a neighboring indented portion or space is not equal to an integral multiple of $(360/P)°$, for reducing the cogging torque effectively. Besides, there are effective arrangements of the indented portions for increasing the dominant fundamental number of the shape harmonics, relating to the pole number P, as described hereinafter.

The dominant fundamental degree number of the shape harmonics of the armature core with the indented portions is designated C and the dominant fundamental degree number of the shape harmonics of the armature core without the indented portions is designated C', and these numbers have the following relation;

$$C = K \cdot C' \quad (1)$$

where K is an integer larger than 1 (K>1). That is, the shape harmonics of the armature core with the indented portions mainly has harmonic components in the C c/r series such as C c/r, 2C c/r, 3C c/r, and so on, and the shape harmonics of the armature core without indented portions mainly has harmonic components in the C' c/r series such as C' c/r, 2C' c/r, 3C' c/r, and so on. As cogging torque has components which exist in both of the shape harmonics and the magnetic distribution harmonics, the dominant fundamental degree number of the cogging torque is L.C.M. (the least common multiple) between these two harmonics. Thus, the dominant fundamental numbers G and G' of the cogging torque for an armature core with the indented portions and without the indented portions are expressed as follows;

$$G = L.C.M. (C,P) \quad (2)$$

$$G' = L.C.M. (C', P) \quad (3)$$

where P is number of poles of permanent magnet, that is the dominant fundamental degree number of the magnetic distribution harmonics of the field permanent magnet member, as described above. When G.C.M. (the greatest common mesure) between C' and P is Q and G.C.M. between P/Q and K is R, G' and G are represented by the next equations;

$$G' = (P \cdot C')/Q \quad (4)$$

$$G = (K/R) \cdot G' \quad (5)$$

From the above equations (4) and (5), in order to increase the dominant fundamental number G of the cogging torque to greater than G', R should be smaller than K. Therefore, the effect of the indented portions for reducing the cogging torque is obtained under the following condition;

$$R < K, \quad (6)$$

and the effect is largest for the following condition;

$$R = 1. \quad (7)$$

It is noticed that a larger value of K is better for reducing the cogging torque. Practically, in most cases, the condition $K/R \geq 3$ is sufficient for reducing the cogging torque. For the embodiment of FIG. 1 the values described above are as follows;

$P = 2$ $C' = 3$ $C = 9$ $K = C/C' = 3$ $Q = G.C.M. (P,C') = 1$ $R = G.C.M. (P/Q,K) = 1$ $G' = (P C')/Q = 6$ $G = (K/R)G' = 18$

For the arrangement of $C = KC'$ and $R < K$ as described above, it is desirable to make the number of the indented portions more than or equal to the number of the spaces. This is also effective for reducing the magnetic permeance variation at each indented portion, because each of the indented portions can be made narrow and shallow to increase of the number of the indented portions. Also, it is better that each of the salient poles has the same number of the indented portions so as to gather flux equally. Different shapes of the salient poles result in variation of the electrical or mechanical output of the rotating electric machine at the polyphase winding coils wound on these salient poles. Practically, in many cases, the total number of the spaces and the indented portions is an integer larger than the multiple 1 of the number of the spaces.

As described hereinbefore, the effect of the indented portions according to the invention of reducing the cogging torque is obtained by arranging at least one indented portion or a major face of at least one saliency of the armature core. That is, the effect is not based on the other factors such as the number of poles of the field permanent magnet member, the number of the saliencies of the armature core, and the phase number and types of the poly-phase winding coils. Also, it is not necessary that the field permanent magnet member be composed of a single permanent magnet. It may be composed of a plurality of separate magnets arranged on the magnets yoke with gaps therebetween. Further, it is understood that the effect of the indented portions of the invention can also be obtained in various cases such as even when the saliencies of the armature core are bent poles of stamped out sheet discs made of soft steel, when the armature core extends partially around the rotary axis, and further when the actual angle of each magnetized pole of the field permanent magnet member is different from the value of $(360/P)°$. Further, the features of the invention described hereinbefore for reducing the cogging torque are also applicable to a rotating electric machine with an axial gap in which the armature core is positioned to leave an axial gap between the field permanent magnet member of a circular form.

FIG. 5 shows another embodiment of the invention, in which each of three salient poles has a major face which is peripherally longer than one pole angle of the field permanent magnet member. A permanent magnet 12 is mounted on a magnet yoke 11 having the inner periphery facing an armature core 13, and the magnet 12 is permanently magnetized to form 8 pairs of N and S poles, that is 16 poles alternating in a circular arrangement so as to make a fixed magnetic field around the armature core 13. The armature core 13 has 3 salient poles 14a, 14b and 14c projecting toward the permanent magnet 12. The major face of each of the salient poles facing the permanent magnet is wider than the bottom part thereof, so that the armature coil can be wound easily thereon and also the armature core effectively gathers the magnetic flux from the permanent magnet. That is, three-phase winding coils 15a, 15b and 15c are wound in spaces 16a, 16b and 16c between the neighbouring two salient poles.

The major faces of the salient poles 14a, 14b and 14c facing to the permanent maget 12 each have two indented portions $17a_1$, $17a_2$; $17b_1$, $17b_2$; and $17c_1$ and $17c_2$, respectively. At these indented portions, the gap between the major face of the salient pole and the permanent magnet 12 is widened. The indented portions are arranged parallel to the rotary axis O, perpendicular to the drawing, and they are positioned at points about ⅓ of the angle 120° between the centers of the spaces on both sides of the salient poles. Therefore, the spaces 16a, 16b and 16c, and the indented portions $17a_1$, $17a_2$, $17b_1$, $17b_2$, $17c$, and $17c_2$ are positioned at equal or nearly equal angles of 40° on the outer periphery of the armature core 13 facing to the permanent magnet 12.

The armature core 13 and the permanent magnet 12 rotate relatively to each other around the coaxial rotary axis O, and so one is a rotor and the other is a stator. The angle of the major face of each salient pole is approximately equal to 112.5°, a multiple of 5 of the pole angle 22.5° of each pole of the permanent magnet 12, so the flux entering the salient pole and passing through the coil changes alternately during rotation with the maximum of the 1 pole flux. When the rotating electric machine of FIG. 5 is used as a generator, 3-phase alternating voltages are generated in the 3-phase winding coils 15a, 15b and 15c during the rotation of the permanent magnet 12 relative to the armature core 13. When the machine is used as a motor, continuous driving torque is provided by supplying controlled 3-phase atternate currents to the 3-phase winding coils 15a, 15b and 15c through a mechanical or electronic commutator, according to the relative position of the permanent magnet 12 and the armature core 13.

The cogging torque of the rotating electric machine of FIG. 5 can be also reduced by the indented portions, as described in the following. Each of the indented portions $17a_1$ to $17c_2$ has an equal or almost equal magnetic effect to that of the spaces 16a, 16b and 16c, and the spaces and the indented portions are positioned at equal or nearly equal angles of, 40° which is not equal to an integral multiple of the 1 pole angle, that is $(360/16)° = 22.5°$, of the permanent magnet 12. In this case, the values relating to the cogging torque described in the former embodiment are as follows:

$P = 16$ $C' = 3$ $C = 9$ $K = C/C' = 3$ $Q = G.C.M. (P,C') = 1$ $R = G.C.M. (P/Q,K) = 1$ $G' = (PC')/Q = 48$ $G = (K/R)G' = 144$

It is understood that G is a multiple of 3 of G' and the cogging torque is reduced by the indented portions.

In this case, the angle between each centers of the two neighbouring indented portions or between the center of an indented portion and the center of a neighboring space is larger than the 1 pole angle of the permanent magnet 12 as shown in the drawing. But, the effect of the indented portions in reducing the cogging torque is also provided even when such angle is not equal to an integral multiple of the 1 pole angle of the permanent magnet. It is desirable that the width of the indented portion be smaller than the 1 pole angle of the permanent magnet, because magnetic variation in the armature core due to the indented portion and variation of the flux density at the gap are reduced by a decrease of the width of the indented portion. The effect of the indented portions in reducing the cogging torque does not depend on the peripheral dimension of the saliency of the armature core, and the effect can be also provided when peripheral dimension of the major face of the saliency of the armature core is almost equal to an odd integral multiple of the 1 pole angle of the permanent magnet and when it has a different dimension.

Figure 6:
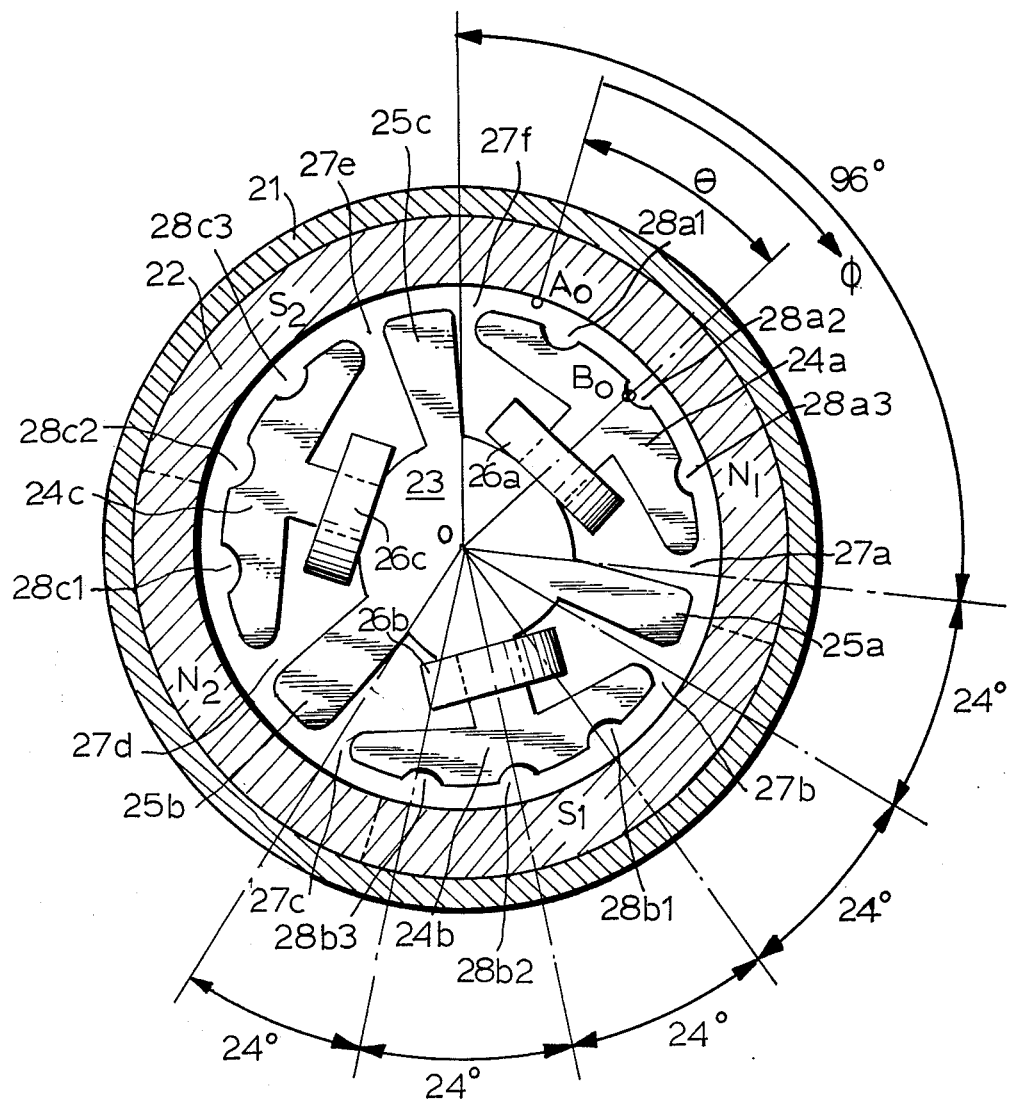
FIG. 6 is a schematic sectional view of a further embodiment of the rotating electric machine of the invention with auxiliary salient poles.

FIG. 6 shows another embodiment of the invention. The rotating electric machine of FIG. 6 is especially suitable for a motor which is to have less ripple torque as well as less cogging torque. A permanent magnet 22 is mounted on a magnet yoke 21 on the inner periphery facing an armature core 23, and it is permanently magnetized so as to have two pairs of N and S poles, that is 4 poles, alternating in a circular arrangement, so as to provide a fixed magnetic field around the armature core 23. The armature core 23 has 3 main salient poles 24a, 24b and 24c, and 3 auxiliary salient poles 25a, 25b and 25c projecting toward the permanent magnet 22. The major face of each of the main salient poles facing the permanent magnet is wider than the bottom part thereof, so that an armature coil can be easily wound thereon and also the armature core effectively gathers the magnetic flux from the permanent magnet. That is, three-phase winding coils 26a, 26b and 26c are wound in spaces 27a, 27b; 27c, 27d; and 27e and 27f between the neighbouring salient poles.

The major faces of the main salient poles 24a, 24b and 24c facing the permanent magnet 22 have 3 indented portions $28a_1$, $28a_2$ and $28a_3$; $28b_1$, $28b_2$ and $28b_3$; and $28c_1$, $28c_2$ and $28c_3$, respectively. At these indented portions, the gap between the major face of the main salient pole and the permanent magnet 22 is widened.

The indented portions are arranged parallel to the rotary axis O, perpendicular to the drawing sheet. The angle between the centers of the two spaces at the sides of the main salient pole is 96° which is equal to a multiple of 4 of the angle 24° between the centers of the two spaces on the sides of the auxiliary salient poles. The spaces 27a to 27f and the indented portions $28a_1$ and $28c_3$ are positioned angles of 24° on the outer periphery of the armature core 23 facing the permanent magnet 22. Each of the indented portions $28a_1$ to $28c_3$ has an equal or almost equal magnetic effect to the spaces 27a to 27f.

Similarly to the embodiments described hereinbefore, the armature core 23 and the permanent magnet 22 rotate relatively to each other around the coaxial rotary axis O, that is a one is rotor and the other a stator. There is provided continuous driving torque by supplying controlled 3-phase alternate currents to the 3-phase winding coils 26a, 26b and 26c through a mechanical or electronic commutator, according to the relative position of the permanent magnet 22 and the armature core 23. As the permanent magnet 22 has 4 permanently magnetized poles, the dominant fundamental number P of the magnetic distribution harmonics is 4. The dominant fundamental number C' of the shape harmonics of the armature core without the indented portions is 3. The dominant fundamental number C of the combination of the shape harmonics of the armature core and the indented portions is 15, because each of the spaces and indented portions, which total 15, and positioned at equal angles of 24° has an equal or almost equal magnet effect. Thus, the following values are calculated;

$K = C/C' = 5$ $Q = G.C.M. (P,C') = 1$ $R = G.C.M. (P/Q,K) = 1$ $G' = (PC')/Q = 12$ $G = (K/R)G' = 60$

The value of G is increased as a multiple of 5 of G', and the cogging torque is greatly reduced by the indented portions.

The reduction of ripple torque, which is defined as torque variation due to geometry of the armature saliencies, the armature winding coils and the magnetized poles of the field permanent magnet member, and which is generated by the interaction between the excited winding coils on the armature core and the permanently magnetized poles of the field permanent magnet member, will be described. As the relative position between the excited winding coils and the magnetized poles changes during to rotation, the driving torque generated by the armature current varies according to the angular displacement.

The permanent magnet 22 is magnetized usually in a trapezoid waveform as shown in FIG. 7(a) with an angle $\phi$ in FIG. 6, where the flux density of an N pole is shown as positive. As the spaces and the indented portions are small and the magnetic variation thereat is negligible relative to the flux density waveform, the flux density waveform on the surface of the permanent magnet is approximately the same as the magnetized waveform. When one coil eg. 26a is excited by a constant current, the generated torque is theoretically proportional to the product of the current value and the derivative of the flux passing through said excited coil from the permanent magnet 22 at the rotational angle $\phi$, which is defined as a mutual angle between a reference point Ao of the permanent magnet 22 and a reference point Bo of the armature core 23. A flux passing through a coil is the flux entering the main salient pole, on which said coil is wound, from the permanent magnet. As flux from a part of the permanent magnet facing a space goes into the neighbouring salient poles on both sides of said space, the angle of a main salient pole gathering flux from the permanent magnet becomes a little wider than the actual geometric angle of the major face of said main salient pole. This is almost equal to the angle between the centers of the spaces on both sides of said main salient pole, that is 96° in the case in FIG. 6. When the magnetic variation of the armature core derived from the indented portions and the spaces are negligibly small, that is considered approximately true, the derivative of the flux passing through the excited coil is approximately proportional to the difference between the flux densities on both sides of the flux-collecting angle of the main salient pole on which said excited coil is wound.

When the magnetic waveform of the permanent magnet 22 is a trapezoid as shown in FIG. 7(a), which is the usual case, the derivatives of the fluxes passing through the 3-phase winding coils 26a, 26b and 26c becomes 3-phase waveforms, as shown in FIG. 7(b). The 3-phase winding coils 26a, 26b and 26c are excited sequentially by the constant armature current which is composed of 3-phase alternate currents ia, ib and ic shown in FIG. 7(c) and controlled by a mechanical or electronic commutator according to the rotational angle $\theta$. Then, there is generated a torque as shown in FIG. 7(d) with less ripple torque. Therefore, the rotating electric machine of FIG. 6 generates a nearly constant driving torque with less ripple torque and less cogging torque. Such a rotating electric machine as that in FIG. 6 can be used as a motor which is particularly suitable for an audio apparatus because of its high quality.

From the above description, it will be understood that a ripple torque can be reduced by widening the flat part of the derivative of the flux passing through the winding coils. Therefore, the conditions necessary for reducing the ripple torque are that the flat part of the magnetic waveform of the field permanent magnet member must be widened, and the angle of the coil must be near an odd integral multiple of the 1 pole angle (360/P) of the field permanent magnet member. Because the field permanent magnet member is magnetized by a charging yoke and the flat part of the magnetic waveform is proportional to the width of the charging face of the charging yoke, the former condition is achieved by giving the charging yoke a number of poles corresponding to the number of salient poles and each of which has a charging face wide enough to achieve the desired condition. The latter condition is also easily achieved by making the number of the main salient poles smaller than the pole number P, and at the same time arranging auxiliary salient poles among the main salient poles.

The flat part of the magnetic waveform of the field permanent magnet member also relates to the cogging torque of the rotating electric machine, because the spectrum distribution of the magnetic distribution harmonics varies according to the flat part of the magnetized waveform. That is, because the higher component of the magnetic distribution harmonics usually becomes larger with an increase of the width of the flat part of the magnetic waveform, the cogging torque for poles without indented portions becomes large because of the widening of the flat part of the magnetic waveform. The indented portion of the poles according to the invention is also effective in this case for reducing the cogging torque, and by providing the indented portion the cogging torque is made small even when the flat part of the magnetic waveform is made wider. Therefore, it is possible to provide a rotating electric machine with reduced cogging torque and reduced ripple torque by providing both the indented portions and auxiliary poles on the armature core. Moreover, the rotating electric machine of FIG. 6 has further advantages of high efficiency and ease of contruction.

The auxiliary salient poles are also useful to reduce the cogging torque as well as to reduce the ripple torque, as described below. If all of the auxiliary salient poles 25a, 25b and 25c shown in FIG. 6 are omitted from the armature core 23, the spaces between adjacent main salient poles 24a, 24b and 24c become much wider. Then, it becomes very difficult to arrange the indented portions so that they have an equal magnetic effect to that of these spaces because it should be much larger for such a large space. Therefore, the auxiliary salient poles are also effective for reducing the cogging torque, when the spaces are too large. Further, it is possible and effective to provide indented portions on the auxiliary salient poles, as can be easily understood.

From the description presented hereinbefore, it can be understood that for an easy and effective method for reducing the cogging torque and/or ripple torque, there are four kinds of conditions as follows;

(1) The number of the main salient poles should be smaller than the number of poles of the field permanent magnet member.
(2) The auxiliary salient poles should be arranged among the main salient poles so that the angular extend of each main salient pole is near an odd integral multiple of the 1 pole angle of the field permanent magnet member.
(3) The ratio of the angle between the centers of the spaces on opposite sides of a main salient pole to the angle between the centers of the spaces on opposite sides of an auxiliary salient pole should be an integer.
(4) The indented portions should have an equal or almost equal magnetic effect to that of the spaces and be arranged so that the spaces and the indented portions are at an equal or nearly equal angle which is not equal to an integral multiple of the 1 pole angle. The rotating electric machine of FIG. 6, which has the same number of alternating main salient poles and auxiliary salient poles, satisfies these four conditions. However, it is noted that a rotating electric machine with reduced cogging torque and reduced ripple torque is not limited to these conditions. As is apparent from the description presented hereinbefore, there can be provided other rotating electric machines with reduced cogging torque and reduced ripple torque, according to the invention. Further, although the embodiments presented hereinbefore use 3-phase winding coils, a rotating electric machine having any type of phase winding coil is possible.

For making the armature core, laminated sheet cores each having the same shape are used to form both the main salient poles and auxiliary salient poles, and in this case the cogging torque and the ripple torque of the rotating electric machine will be stable even though the cores are produced by mass production since the shape of the armature cores hardly vary at all. But, for the convenience of winding the coils, the armature core is separated to a set of main salient poles and a set of auxiliary salient poles. For example, the main salient pole set is made by laminating stamped out sheet cores, and the auxiliary salient pole set is made of a soft steel disk having bent auxiliary salient poles. In this case, after winding the poly-phase winding coils on the bottom parts of the main salient poles, the auxiliary salient pole set is connected mechanically and magnetically to the main salient pole set so as to position the auxiliary salient poles among the main salient poles.

For reducing the ripple torque, it is desirable that the number of the indented portions is greater than or equal to the number of the spaces, so that the indented portions are narrower and shallower and magnetic variation at each of the indented portions is smaller. It is also desirable, for reducing the ripple torque, to provide the same number of the indented portions on each main salient pole, and to make each main salient pole magnetically symmetric about the center thereof.

The rotating electric machine of FIG. 6 can also be used as a generator. It generates 3-phase alternating voltages the waveforms of which are the same as shown in FIG. 7(b) by rotating at a constant angular speed, because each of the generated voltages is also proportional to the product of the angular speed and the derivative of the flux passing through each of the phase winding coils. Thus, a D.C. voltage having only a little ripple voltage is easily obtained from the 3-phase alternating voltages just by rectifying them with 3 diodes, the negative poles of which are connected in common, or with a mechanical commutator. This D.C. voltage is often used as a detected signal varied according to the angular speed for controlling the speed of the rotating electric machine.

FIG. 8 shows another embodiment of the invention which uses lap wound poly-phase winding coils. A permanent magnet 32 is mounted on the inner periphery of a magnet yoke 31 facing an armature core 33, and it has two permanently magnetized pairs of N and S poles, that is 4 poles, in an alternating and circular arrangement, so as to provide a fixed magnetic field around the armature core 33. The armature core 33 has 12 salient teeth 34a to 34l projecting toward the permanent magnet 32. The major face of each of the salient teeth 34 facing the permanent magnet 32 is wider than the bottom part thereof, so that the armature winding can be easily wound thereon, and also the armature core effectively gathers the magnetic flux from the permanent magnet 32. That is, armature coils $35a_1$ to $35c_4$ are wound in spaces 36a to 36l between neighbouring pairs of the twelve salient teeth facing the permanent magnet 32.

Each major face of the salient teeth 34a to 34l has one indented portion of 37a to 37, respectively. At thise indented portions, the gap between the major face of the salient tooth and the permanent magnet 32 is increased. The indented portions extend parallel to the rotary axis O, perpendicular to the drawing, and they are positioned at about midway of the 30° angle between the centers of the spaces on opposite sides of the salient tooth. Therefore, the spaces 36a to 36l and indented portions 37a to 37l are positioned at equal or nearly equal angles of 15° on the outer periphery of the armature core 33 facing the permanent magnet 32. Each of the indented portions 37a to 37l has an equal magnetic or almost equal effect to that of the spaced portions 36a to 36l, although the depth of the indented portion is much less than the depth of the spaces.

The armature core 33 and the permanent magnet 32 rotate relative to each other around the coaxial rotary axis O, that is one a rotor and the other a stator. As the armature coils $35a_1$ to $35c_4$ form 3-phase winding coil groups $35ai$, $35bi$ and $35ci$ (i=1,2,3,4), and when using the rotating electric machine of FIG. 7 as motor, a continuous driving torque is obtained by supplying controlled 3-phase alternating currents to the 3-phase winding coil groups $35ai$, $35bi$ and $35ci$ through a mechanical or electronic commutator, according to the relative position of the permanent magnet 32 and the armature core 33.

For the rotating electric machine of FIG. 8, the values of the factors for the dominant fundamental number of the cogging torque are as follows;

$P=4$ $C'=12$ $C=24$ $K=C/C'=2$ $Q=G.C.M. (P, C')=4$ $R=G.C.M. (P/Q,K)=1$ $G'=(PC')/Q=12$ $G=(K/R)G'=24$

As G is increased to a multiple of 2 of G', the cogging torque is reduced.

As for the ripple torque of the rotating electric machine of FIG. 8, the face angle of each winding coil gathering flux from the permanent magnet 32 is equal or almost equal to the angle between the centers of the two spaces where said winding coil is arranged, that is to one pole angle 90° of the permanent magnet 32. The flat part of the magnetic waveform of the permanent magnet 32 is widened enough within an acceptable small cogging torque by means of the indented portions. Accordingly, the rotating electric machine of FIG. 8 will have reduced ripple torque and reduced cogging torque. The rotating electric machine of FIG. 8 can be also used as a generator, and a DC voltage with reduced ripple voltage is generated, similarly to the rotating electric machine of FIG. 6.

FIGS. 9a and 9b and 10a and 10b show another embodiment of the invention using bent salient poles. FIG. 9(a) is a cross-sectional view of the rotating electric machine using the bent salient poles, and in exploded view of FIG. 9(b) the parts of the machine are separated along the axis to clarify their relationship with each other.

The armature elements are mounted on a base 41. A bearing core 43 made of soft steel is firmly gripped at a center aperture 42, and it has two bearings 44 and 45 at opposite sides so as to support a rotor shaft 59. The bearing core 43 forms a support for a soft steel disc 46 having two bent salient poles 46a and 46b facing a permanent magnet 57. A center aperture 47 of the disc 46 has a diameter fitting the bearing core 43. A short and hollow cylinder 48 made of soft steel constitutes a connecting core 48, which is mounted on the bearing core 43 at the back surface of the disc 46. The connecting core 48 serves as a low reluctance support for a cylindrical core 50 wound on a coil form 49, and also as a spacer to separate a second disc 51 from the first disc 46.

The second disc 51 has two bent salient poles 51a and 51b which are positioned between the bent salient poles 46a and 46b of the first disc 46 without touching to them. A third soft steel disc 52 having two bent salient poles 52a and 52b is mounted on the bearing core 43 on the opposite side of the second disc 51 from the disc 46. Another connecting core 53 of soft steel and another cylindrical coil 55 would on another coil form 54 are also mounted on the bearing core 43. A forth soft steel disc 56 having two bent salient poles 56a and 56b is mounted on the connecting core 53. The bent salient poles 56a and 56b are positioned between the bent salient poles 52a and 52b of the third disc 52 without touching to them. These four discs 46, 51, 52 and 56 are firmly fixed to the base 41. Thus, the armature core is composed of the two identical basic blocks axially laminated, each of which is composed of two soft steel discs, magnetic connecting means between said two discs, and at least one cylindrical coil wound around the rotary axis.

A cylindrical permanent magnet 57 is mounted on the inner periphery of a magnet yoke 58 and positioned at the outer periphery of the armature core. The magnet yoke 58 has a rotary shaft 59 inserted to the bearings 45 and 44 in order to rotate relative to the armature core. The permanent magnet 57 is magnetized so as to have two pairs of N and S poles, that is 4 poles, in alternating and circular arrangement so as to provide a fixed magnetic field around the armature core.

FIGS. 10(a) and (b) are developed views of the permanent magnet 57 and the bent salient poles of the four soft steel discs 46, 51, 52 and 56 facing the magnetized poles of the permanent magnet 57, respectively. The steel discs 46, 51, 52 and 56 each have two bent salient poles 46a, 46b; 51a, 51b; 52a, 52b; and 56a, 56b, respectively, each of which has the major face facing the permanent magnet 57. The face angle of each bent salient pole is equal or almost equal to the one pole angle 90°. The bent salient poles 46a to 56b each have two indented portions $60c_1$ to $c_4$, $60d_1$ to $d_4$, $60e_1$ to $e_4$, and $60f_1$ to $f_4$, respectively at about ⅓ of the face angle 90° of each bent salient pole. Each of the indented portions has an equal magnetic or almost equal effect to that of the spaces $60a_1$ to $a_4$, and $60b_1$ to $b_4$ between neighbouring bent salient poles, and these spaces and indented portions are positioned at equal or nearly equal angles of 15°.

The flux passing through the winding coil 50 comes from the permanent magnet 57 to the bent salient poles 46a and 46b of the soft steel disc 46, and the flux passing through the winding coil 55 to the bent salient poles 56a and 56b of the soft steel disc 56. The flux of the winding coil 50 has a delay of 45°, half of the one pole angle, from the flux of the winding coil 55. Thus, by using this rotating electric machine as a motor, continuous driving torque is obtained by supplying controlled currents to the coils 50 and 55 through a mechanical or electronic commutator, according to the relative position of the permanent magnet 57 and the armature core.

Figure 9B:
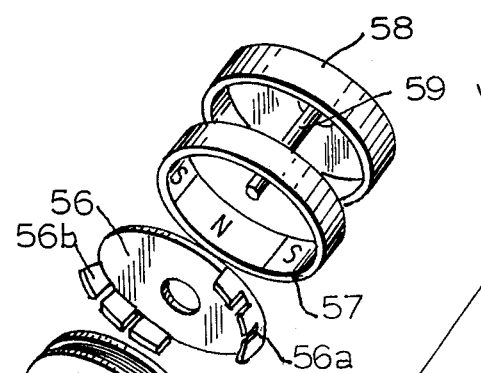

As for the cogging torque of the rotating electric machine shown in FIGS. 9a and 9b, the values of the factors related to the cogging torque are as follows;

$P = 4$ $C' = 8$ $C = 24$ $K = C/C' = 3$ $Q = \text{G.C.M.} (P, C') = 4$ $R = \text{G.C.M.} (P/Q, K) = 1$ $G' = (PC')/Q = 8$ $G = (K/R)G' = 24$ G is increased by a multiple of 3 of G' and it will be understood that the cogging torque is reduced by providing the indented portions.

This rotating electric machine also has reduced ripple torque when it is used as a motor, because the face angle of each bent salient pole gathering flux from the permanent magnet to the winding coils is equal or almost equal to the one pole angle 90° of the permanent magnet, and because the flat part of the magnetic waveform of the permanent magnet is widened within an acceptable small cogging torque by the indented portions. Thus, the rotating electric machine shown in FIGS. 9a and 9b will have reduced ripple torque as well as reduced cogging torque.

Because each of the soft steel discs 46, 51, 52 and 56 is the same shape, they can be treated as one part during production. The effect of the indented portions does not depend on other factors such as the way of making the salient poles, types of outer rotor or inner rotor, the manner of winding, and so on, and the actual shape of the indented portion may be changed whenever it has an equal magnetic effect. For example, the indented portion 60c, may be replaced by a straight slit from the upper end to the lower end of the bent salient pole. The face angle of each bent salient pole can be made equal to an odd integral multiple of the one pole angle of the field permanent magnet member by increasing the number of poles of the field permanent magnet member, for further reducing the cogging torque.

What is claimed is:

1. A rotating electric machine comprising a field permanent magnet member of a circular form and an armature core made of a magnetic material, said magnet member being permanently magnetized as N and S poles alternately positioned around the rotary axis of said rotating electric machine to produce field fluxes, the number of said N and S poles being P which is an even number larger than or equal to 2, and said armature core being coaxial with said magnet member and having a plurality of saliencies facing said magnet member and a plurality of polyphase winding coils which generate polyphase alternate voltages during relative rotation between said armature core and said magnet member, at least one of said saliencies having at least one indented portion in the face thereof opposed to said magnet member, and the angle between a line from the center of said indented portion to said rotary axis and a line from the center of a neighbouring indented portion or from the center of a neighboring space between two neighbouring saliencies to said rotary axis is not equal to an integral multiple of the quotient of (360/P)°.

2. A rotating electric machine as claimed in claim 1, wherein a dominant fundamental degree number C of the shape harmonics of said armature core having said indented portions is a multiple K of a dominant fundamental degree number C' of the shape harmonics of an armature core having no indented portions, where K is an integer larger than 1.

3. A rotating electric machine as claimed in claim 2, wherein the greatest common measure R between K and P/Q is smaller than K, where Q is the greatest common measure between C' and P.

4. A rotating electric machine as claimed in claim 3, wherein R is 1.

5. A rotating electric machine as claimed in claim 1, wherein each of said indented portions has an equal or almost equal magnetic effect to that of each of said spaces, and said indented portions and spaces are positioned at equal or nearly equal angles around said magnet member.

6. A rotating electric machine as claimed in claim 1, wherein the number of said indented portions is larger than or equal to the number of said spaces.

7. A rotating electric machine as claimed in claim 6, wherein the total number of said indented portions and said spaces is a multiple J of the number of said spaces, where J is an integer larger than 1.

8. A rotating electric machine as claimed in claim 7, wherein each of said saliencies has the same number of indented portions.

9. A rotating electric machine as claimed in claim 1, wherein said indented portion is parallel to said rotary axis.

10. A rotating electric machine as claimed in claim 1, wherein said armature core further has a plurality of auxiliary salient poles, and the ratio of the angle between two centers of the spaces on the opposite sides of an arbitrary one of said saliences to the angle between two centers of the spaces on the opposite sides of an arbitrary one of said auxiliary salient poles is equal or almost equal to L/M where L and M are integers, and said intended portions and spaces formed by said saliencies and said auxiliary salient poles are positioned at an equal or nearly equal angle.

11. A rotating electric machine as claimed in claim 10, wherein the number of said saliencies is less than the number of poles of said permanent magnet member, and the angle between two centers of the spaces on the opposite sides of one of said saliencies is equal or almost equal to a multiple S of the 1 pole angle of said permanent magnet member, where S is an odd integer larger than or equal to 1.

12. A rotating electric machine as claimed in claim 10, wherein the number of said saliences is equal to the number of said auxiliary salient poles, and said saliences and said auxiliary salient poles are alternately arranged.

13. A rotating electric machine as claimed in claim 1, where the angle of said face of said saliency opposed to said magnet member is equal or almost equal to a multiple multiple of the 1 pole angle of said permanent magnet member, where T is an odd integer larger than or equal to 1.

14. A rotating electric machine as claimed in claim 3, wherein said poles of said magnet member are spaced at equal or almost equal angles around said armature core.

15. A rotating electric machines are claimed in claim 7, wherein each of said saliencies has one of said winding coils wound on the bottom part of said saliency.

16. A rotating electric machine as claimed in claim 1, wherein each of said indented portions has a magnetic effect comparable to that of each of said spaces.

17. A rotating electric machine as claimed in claim 16, wherein said indented portions and spaces are positioned at an equal or nearly equal angle to said magnet member.

18. A rotating electric machine as claimed in claim 1, wherein said indented portion is oblique to said rotary axis.

19. A rotating electric machine as claimed in claim 1, wherein the angle of each face of said saliencies opposed to said magnet member is equal to or almost equal to a multiple T of $(360/P)°$, where T is an odd integer larger than or equal to 1.

* * * * *